Patented Nov. 15, 1938

2,137,171

UNITED STATES PATENT OFFICE 2,137,171

COMPOSITE CARBOHYDRATE FILMS

Harold A. Levey, New Orleans, La.

No Drawing. Application September 25, 1936, Serial No. 102,600

16 Claims. (Cl. 18—57)

The present invention is directed to the production of transparent self-sustaining hemi-cellulose sheeting or films preferably carrying on one or both sides of the film a protective coating such as a waterproof coating. The naturally occurring vegetable carbohydrate gums are examples of hemi-celluloses which are eminently suitable for producing films of the character set forth. These gums are sometimes loosely termed "pentosan gums" in the literature. While this term is clear and accurate as applied to the gums of the nature of araban, xylan and the like which yield arabinose and xylose (five carbon sugars) on treatment with dilute acids, it is believed somewhat misdescriptive as applied to naturally occurring carbohydrate gums of the nature of galactan and mannan which yield galactose and mannose by hydrolysis, since mannose and galactose are six carbon sugars. Mannose and galactose are perhaps more accurately termed, therefore, "hexosans" and where in this specification the term "hexosan" is used, a naturally occurring carbohydrate gum, such as galactan and mannan yielding a six carbon sugar or hexose on hydrolysis, is meant.

The pentosan and hexosan gums may be obtained from a wide variety of vegetable life, including many woods, sea weeds, grasses, and other perennials. Excellent films may be obtained from various bean gums, such as locust bean, honey locust bean, carob bean or seed mesquite, and similar beans. The product obtained by extracting the hexosan gum content of these beans and similar products is a mixture of hexosans, principally mannan and galactan, the former being present in about 60% and the latter in about 30%. Other hexosans and pentosans may also be present. The related pentosans including araban, xylan, and the like or mixtures thereof all produce self-sustaining films.

Self-sustaining films produced from the naturally occurring water-soluble carbohydrate gums are inherently flexible and moreover, this flexibility is independent of humidity changes. The absence of the plasticizing agent, which is usually hygroscopic, makes the film produced in accordance with the present invention nonhygroscopic. In other words, no plasticizing agent is necessary to render the gum films sufficiently flexible to be used as a packaging material in a manner similar to "Cellophane".

The self-sustaining films of the present invention are also charaterized by excellent tensile strengths.

When locust bean kernels are steeped with water, Tragasol gum is produced as outlined by H. C. Fuller in "The Chemistry and Analysis of Drugs and Medicines". This material is prepared at Mallorca, an island off the coast of Spain. The firm of A. & R. F. Pons of Barcelona are the selling agents. This firm designates the gum as Harina de Endosphermo de Semilla de Algarroba, and their pamphlets set forth the chemical nature of the material as well as its physical properties and industrial uses. When used in the textile art it is sold under the name of "Aprestagum".

The Tragasol gums produced by steeping and warm water extraction are treated as follows: One part of Tragasol on a dry basis is mixed with from about forty to sixty parts by weight of water, and the mixture is thoroughly homogenized by any suitable means, as by an exceedingly rapidly driven impeller blade operating at about 3,000 R. P. M. with a four inch two blade impeller, the pitch of the blades being from 20 to 30 degrees with reference to the plane of revolution. For larger masses, the R. P. M. will vary so as to maintain an equivalent degree of agitation. Any other procedure may be employed to produce a readily flowable plastic. For example, the gelatinous mass may be passed through a standard colloid mill with adjustable plates or poles. As will be seen from the foregoing treatment no reacting substance is added to the gum in order to solubilize the same inasmuch as the naturally occurring vegetable carbohydrate gums treated in accordance with the invention, as before stated, are water soluble. They may, therefore, be made into films in accordance with the process hereinbefore described without chemical change.

This processing preferably should be carried out so as to reduce the amount of air entrapped to a minimum. However, where a considerable amount of air is entrapped in the form of small bubbles, clarification, while not absolutely necessary, is highly desirable, and such clarification may be carried out in any suitable manner. In order to clarify or deaerate, the plastic mass is placed in a closed vessel equipped with a slowly moving agitator, whose rate of travel through the mass, and the pitch of the blades of which are such as to work the mass from the bottom toward the top or upper layer of the plastic. At the same time, the closed vessel is connected with a vacuum pump which removes the air above the plastic, and with the assistance of the impeller blades, the plastic is churned, continuously moving the entrapped air bubbles to the surface, while the space above same is being continually evacuated by the known means described above. Within twenty minutes to a half an hour after being subjected to this treatment, the mass is completely transparent, and all visible air bubbles appear to be removed. This treatment and time refers to a depth of plastic approximating ten inches. Greater depths will obviously require somewhat longer time of treatment to procure equivalent results.

The gum plastic is then heated to reduce its viscosity, when such heating seems to be desirable. The heating step is optional. When processing locust bean gum, and particularly Tragasol, the plastic is heated to about 60° C. With different gums, the degree of heating will vary, and, therefore, the above specific temperature is illustrative, and not by way of limitation.

The gum plastic is then spread into film or sheeting form and this may be accomplished by applying the plastic to a clean highly polished inert metallic surface such as nickel, stainless steel, aluminum and the like. Enduro stainless steel containing 18% of chromium and 8% of nickel is suitable. Instead of using metallic surfaces, non-metallic surfaces may be used, such as polished Bakelite, glass, rubber and equivalent surfaces. The carrier surface is preferably heated to approximately the temperature to which the plastic is heated. The plastic is extruded on the carrier through any suitable extrusion nozzle or other film-forming device already in use in the art of manufacturing transparent sheeting from cellulose derivatives.

Any smooth polished surface of the character set forth may be coated with an agent facilitating the removal of the ultimate sheet. A thin film of wax such as carnauba wax, candelilla paraffin and the like is satisfactory. The wax may be applied as a suspension. For example, a mixture of carnauba wax 75%, and paraffin wax 25% by weight is suspended or dispersed in a highly volatile solvent, such as benzol, acetone, or similar mixed solvents, preferably using one part by weight of wax to eighty parts of solvent. All excess wax should be carefully wiped off or a cloudy film will result. Instead of using waxes, oils may be used, as for example, cotton seed oil, corn oil, oleo-stearine, etc. The gum plastic is extruded or poured onto the carrier surface and gauged down to the desired thickness by a doctor blade or scraper which moves over strips of such thickness as will produce an ultimately dried film of the desired dimensions. The dried film may vary in thickness depending on its specific uses, but as a rule will vary between .001" and 0.003". Under some circumstances, the film may be even thinner, and of the order of .0001 of an inch thick.

The carrier surface may be a belt, a wheel or a cylinder or a heavy liquid which is incompatible with the hemi-cellulose plastic such as locust bean gum, and upon which the latter may be floated. Examples of such liquids are a mercury bath, ortho-di-chlor-benzene, tetra-chlorethane, and the like.

The carrier surface and the gum sheeting is dried in an oven at an elevated temperature, the pressure, preferably, although not necessarily, being reduced, rapidly moving air passes counter-currently to the direction of passage of the film. The temperature of the drying air may range between 80 to about 150° C. and carry moderate amounts of humidity equivalent to 20% to 35% relative when the temperature is less than 100° C. If lower temperatures are used, the drying period is correspondingly longer. The temperature of drying may vary greatly, so long as the temperature is not sufficient to char or damage the sheet. The velocity of the air may range from 25 to 100 linear feet per minute over the drying film. It may be stated that the time of drying varies with the thickness of the film, the temperature and the relative humidity of the drying air, and the velocity with which the air passes over the drying sheet.

The film is removed from the carrier surface by picking initially, and then subsequently winding upon a suitable receiving spool. The film produced as above may be used as such, but preferably has one or both of its surfaces coated with a waterproofing composition to render the film substantially waterproof. The waterproofing compositions may be those set forth in applications, Serial Nos. 84,563 and 87,590, said compositions including the following classes:

1. Cellulose derivatives such as the cellulose esters and ethers dissolved in their respective solvents, and to which has been added the recognized plasticizing agents for these substances.
2. The various natural and synthetic resins dissolved in their specific solvents, and plasticized when necessary.
3. The oleo resinous varnishes and spirit lacquers.
4. Suitable solutions of the various types of natural and synthetic rubbers and rubber derivatives.
5. Thin wax deposits obtained by deposits of these natural and synthetic waxes or mixtures of same from their suspensions or solutions, or by actually melting and applying such liquids to the surfaces of this sheeting by such known methods as spraying, brush application, printing from rolls, flowing on same, or by immersing or dipping.

One waterproofing coating may be made by preparing the following composition:

|  | Per cent |
|---|---|
| Cellulose acetate (5 sec. viscosity) | 75 |
| Ethyl-para-toluene-sulfonamide | 25 |

This may be dissolved in five (5) unit weights of the following solvent to produce the final waterproofing material:

|  | Per cent |
|---|---|
| Acetone | 90 |
| Diacetone alcohol | 10 |

Instead of using cellulose acetate lacquer, the following waterproof coatings may be prepared and used:

|  | Per cent |
|---|---|
| 1. Cellulose nitrate | 15 |
| Ethyl acetate | 40 |
| Di-butyl phthalate | 5 |
| Butyl acetate | 20 |
| Benzol | 12 |
| Methanol | 8 |

2. In the above composition, the cellulose nitrate may be substituted by a cellulose ether, including those specifically hereinbefore mentioned.

|  | Per cent |
|---|---|
| 3. Natural resins | 25 |
| Butyl acetate | 40 |
| Acetone | 15 |
| Benzol | 12 |
| Methanol | 8 |

The solvent mixture of the above set forth composition may be modified to meet the requirements of the various types of natural resins in order to produce a clear transparent film. It will also serve for most of the synthetic resins.

|  | Per cent |
|---|---|
| 4. Rubber solutions (solids) | 10 |
| Ethylene di-chloride | 90 |

Other solvents such as carbon bi-sulphide, acetone, solvent naphtha, etc. may be used in place of the above depending upon the particular form of rubber used in formulating the coating composition.

|  | Per cent |
|---|---|
| 5. Waxes | 6–10 |
| Solvents | 94–90 |

The solvents or solvent mixtures will depend upon the particular wax used. For paraffin, solvent naphtha may be used; for Halowaxes or chlorinated naphthalenes, ethylene dichloride may be used; for true waxes such as spermacetti, carnauba and the like varying mixtures of acetone, ethyl acetate and the like may be used.

Sheeting similar to that described may be prepared by extracting the carbohydrate gum content of various beans by steeping and warm water extraction, filtering the solution or colloidal mass through a suitable screen or cloth, and processing as described above. While the best results are obtained by extracting locust bean, similar results are also procurable from honey locust bean, the carob bean or seed, the mesquite bean and similar varieties of these species.

If the gum, due to inherent properties or to processing steps, does not have the property of forming a self-sustaining film, this characteristic may be imparted to the gum through the addition of small amounts of "a starch base" having film-forming properties, such as hereinafter mentioned. The "starch base" may be added in any suitable amount depending upon the particular gum used. As a general rule, 10% to 30% will be sufficient to render the film continuous and self-sustaining, but smaller or greater quantities may be used.

At this point it is desired to state that the term "starch base" includes starch derivatives and starch degradation products. The term "starch derivative" is intended to cover any product which may be obtained from starch as a starting point and which contains in its molecule a more or less modified form of starch. The term "starch derivative" includes such products as starch esters and starch ethers and dextrines. Starch hydrate and partially hydrolyzed starch, which is really starch itself, responds to the blue iodine test, which appears to be the criterion to determine the presence of starch. The degradation products which may be completely or partially degraded, do not give the blue iodine test. For example, a degraded product consisting of so-called erythro dextrine gives a red iodine coloration, while totally dextrinized starch gives no color reaction with iodine. Further, on complete hydrolysis by acid treatment or with enzymes or bacteria of the proper type, a theoretically one hundred per cent (100%) yield of dextro-glucose should result.

The term "starch hydrate" as used in the present specification, covers the product which results from the heating of the vegetable starches with a substantial amount of water in a nearly neutral solution to the bursting of the granules, and continued heating at substantially the bursting temperature until the plasic mass clarifies. Research work indicates that starch treated as above set forth is the least degraded form of starch. The molecular aggregate is very high and gives the characteristic blue iodine test and almost a theoretical yield of glucose.

It is desired to state that when the starch is treated with alkali, such as caustic soda, in relatively small amounts, as for example, in amounts less than six per cent (6%), the degradation of the starch is relatively small, as shown by the blue iodine coloration. Practically none of the starch is converted into dextrines or sugars.

While films produced from such mixtures may not be completely transparent, although in some cases they are, when such films are coated on one or both sides, they develop a transparency comparable with that of glass. These films may not be transparent due largely to a slight surface roughness on the air side, as distinguished from a glassy surface produced by the high polish of the metal carrier.

As pentosans, hexosans and similar hemi-celluloses are obtainable from various types of pith and many of the grasses, sheeting may be prepared therefrom. In general, the stalks are shredded, boiled with water and allowed to stand. The resulting product is then filtered and treated as hereinbefore described. Certain varieties, however, such as the cereal grasses, as exemplified by wheat and oats stalks, require long boiling, while others, such as young shrub stalks are allowed to stand in a 3% to 5% alkali solution for a suitable length of time. For example, using a caustic soda solution, six (6) hours is sufficient. The piths from sugar cane stalks and cornstalks, as well as the wood piths, yield to very much milder alkali treatment, forming gelatinous masses, which may be coagulated by neutralization with acid, or precipitated by the addition of alcohol. This precipitation or coagulating operation is done after the plastic solution has been given the form of a film.

Sheeting may also be made from beta and gamma cellulose obtained from wood. Shredded wood such as saw dust is steeped with an alkali solution, or any solution which will extract the beta and gamma cellulose. When using caustic soda as the steeping agent, a 5% solution usually gives satisfactory results. In some cases, the extraction is facilitated by heating, as for example, to 60° to 70° C. This treatment extracts from the wood the beta and gamma cellulose together with a goodly portion of the lignins. Before film-forming, the lignins are neutralized with a suitable acid such as dilute acetic, which throws out the beta cellulose and a portion of the lignins. In treating with acid, it is necessary to use only sufficient acid to neutralize the alkali. Excess acid should be avoided as this will result in hydrolyzing these carbohydrates into hexose sugars. As some of these recovered cellulosic products do not of themselves form continuous self-sustaining films, it becomes desirable to add the necessary amount of starch hydrate, gum arabic, or the like, acting as the vehicle in becoming the desired type of film.

The remaining lignins are substantially completely removed by a suitable lignin-removing agent, as for example, mild chlorine treatment or by solvent extraction using alcohol, benzol, turpentine or the like. It is desired to point out that these films are substantially improved by the addition of a "starch base" having film-forming properties, such as starch hydrate, in a manner above referred to. As the usual thing 10% to 30% of the starch base is sufficient to produce a continuous self-sustaining film.

The pentosan gums are extractable from a wide variety of woods.

The sheeting produced as above set forth from wood gums, may have one or both sides provided with a waterproof coating.

In my prior Patent No. 2,012,344, reference is made to the production of films from pentosan and pentosan gums, but the basic thought set forth therein involves the addition of plasticizing agents to render the gum film flexible to enable it to be used as a packaging or wrapping material. It has now been discovered that broadly transparent self-sustaining films can be produced by merely leaching beans, sea-weeds and the water soluble extracts of certain woods to obtain the naturally occurring carbohydrate gums, and that self-sustaining films may be made from the so-prepared gums, said films possessing inherent flexibility sufficient to enable the film to be used for packaging. In other words, no addition product need be added to effect the desired flexibility. It is desired to point out that the use of a plasticizer renders the film subject to humidity changes, and without the plasticizer, the flexibility of the film is independent of humidity changes. The tensile strength of these gum films is substantially greater than a "starch base" film of equivalent thickness. The films of the present invention when coated with a correctly formulated lacquer or coating composition, as herein set forth, form a composite film of glass-like transparency.

The term "self-sustaining" is used to denote a film which is capable of physical existence, as such, without being carried or supported upon any surface upon which it is spread.

The film is capable of many uses, as set forth in my prior patent and in applications, Serial Nos. 80,919, 84,563 and 87,590.

Mixtures of water-soluble pentosans and hexosans and water soluble pentosan and hexosan gums or mixtures thereof with a starch base having film-forming properties may be used to produce self-sustaining films in accordance with the present invention, said film being provided with a protective coating on one or both sides, as specified, to produce a finished composite film of glass-like transparency. More specifically, the gum may be selected from water soluble gums, such as arabic, tragacanth, karaya, locust bean, honey locust bean, carob, mesquite, wood gums, pith gums and stalk gums, and then mixed with any one of the other gums or with any two of the other gums, or even with a greater number. Such mixtures may have a starch base having film-forming properties mixed therewith. The starch base may contain a preservative as pointed out in my application, Serial No. 84,563.

What I claim is:—

1. A transparent non-hygroscopic self-sustaining thin sheet consisting substantially of naturally occurring water-soluble chemically unchanged vegetable carbohydrate gum, said sheet being characterized by the property of being inherently sufficiently flexible to be used for the wrapping of articles, while being devoid of extraneously added plasticizer, said flexibility being independent of humidity changes.

2. A transparent non-hygroscopic self-sustaining thin sheet consisting substantially of water-soluble chemically unchanged pentosan gum, said sheet being characterized by the property of being inherently sufficiently flexible to be used for the wrapping of articles, while being devoid of extraneously added plasticizer, said flexibility being independent of humidity changes.

3. A transparent non-hygroscopic self-sustaining thin sheet consisting substantially of naturally occurring water-soluble chemically unchanged carbohydrate gum coated with a flexible protective film, said sheet being characterized by the property of being inherently sufficiently flexible to be used for the wrapping of articles, while being devoid of extraneously added plasticizer, said flexibility being independent of humidity changes.

4. A transparent non-hygroscopic self-sustaining thin sheet consisting substantially of water-soluble chemically unchanged pentosan gum and coated with a protective film, said sheet being characterized by the property of being inherently sufficiently flexible to be used for the wrapping of articles, while being devoid of extraneously added plasticizer, said flexibility being independent of humidity changes.

5. The herein described packaging material consisting of a transparent self-sustaining thin sheet consisting substantially of Tragasol gum, said sheet being characterized by the property of being inherently sufficiently flexible to be used for the wrapping of articles, while being devoid of extraneously added plasticizer, said flexibility being independent of humidity changes.

6. The herein described packaging material consisting of a transparent self-sustaining thin sheet consisting substantially of naturally occurring water-soluble chemically unchanged hexosan gum coated with a flexible protective cellulosic film, said sheet being characterized by the property of being inherently sufficiently flexible to be used for the wrapping of articles, while being devoid of extraneously added plasticizer, said flexibility being independent of humidity changes.

7. The process of producing a transparent sheeting comprising digesting a material containing water soluble hexosan gums with water free from substances capable of reacting with the hexosan gums in the ratio of about 40 to 60 parts of water to one of solid material, to form a colloidal mass therefrom, agitating the mass to increase the plasticity and convert the mass into a flowable plastic, casting the plastic in sheet form upon a casting surface, allowing the sheet to solidify, and thereafter removing the self-sustaining sheet from the casting surface.

8. The process of producing a transparent sheeting comprising digesting a material containing water soluble hexosan gums with water free from substances capable of reacting with the hexosan gums to form a colloidal mass therefrom, agitating the mass to increase the plasticity and convert the mass into a flowable plastic, removing entrapped air bubbles therefrom, casting the deaerated plastic in sheet form upon a casting surface, removing the excess water therefrom, and thereafter removing the self-sustaining sheet from the casting surface.

9. The process of producing transparent sheeting comprising digesting a material containing water soluble hexosan gums with water free from substances capable of reacting with the hexosan gums to form a mass therefrom, agitating the mass to increase the plasticity and convert the same into a flowable plastic, removing entrapped air bubbles therefrom, heating the deaerated plastic, casting the so-treated plastic in sheet form upon a casting surface, removing the excess water therefrom, and thereafter removing the self-sustaining sheet from the casting surface.

10. The process of producing a transparent sheeting comprising digesting a material containing water soluble hexosan gums with water free from substances capable of reacting with the hexosan gums in the ratio of about 40 to 60 parts of water to one of solid material, to form a colloidal mass therefrom, agitating the mass to increase the plasticity, and convert the same into a flowable plastic, removing entrapped gases therefrom, heating the so-treated plastic, casting the plastic in film form upon a casting surface, removing the excess water, and thereafter removing the self-sustaining film from the casting surface.

11. A transparent self-sustaining thin sheet consisting substantially of hexosan gum typified by locust bean gum, said sheet being coated with a flexible protective film and characterized by the property of being inherently sufficiently flexible to be used for the wrapping of articles, while being devoid of extraneous added plasticizer, said flexibility being independent of humidity changes.

12. A transparent self-sustaining thin sheet consisting substantially of naturally occurring water-soluble chemically unchanged hexosan gum, said sheet being characterized by the property of being inherently sufficiently flexible to be used for the wrapping of articles, while being devoid of extraneously added plasticizer, said flexibility being independent of humidity changes.

13. A transparent self-sustaining thin sheet consisting substantially of a mixture of water-soluble chemically unchanged pentosan gum and naturally occurring hexosan gum, said sheet being characterized by the property of being inherently sufficiently flexible to be used for the wrapping of articles, while being devoid of extraneously added plasticizer, said flexibility being independent of humidity changes.

14. A transparent self-sustaining thin sheet consisting substantially of water-soluble chemically unchanged naturally occurring hexosan gum and coated with a protective film, said sheet being characterized by the property of being inherently sufficiently flexible to be used for the wrapping of articles while being devoid of extraneously added plasticizer, said flexibility being independent of humidity changes.

15. A transparent self-sustaining thin sheet consisting substantially of a mixture of water-soluble chemically unchanged pentosan gum and naturally occurring hexosan gum and coated with a protective film, said sheet being characterized by the property of being inherently sufficiently flexible to be used for the wrapping of articles while being devoid of extraneously added plasticizer, said flexibility being independent of humidity changes.

16. The process of producing transparent sheeting comprising digesting a material containing water soluble naturally occurring vegetable carbohydrate gum with water free from substances capable of reacting with the gums in the ratio of about 40 to 60 parts water free from substances capable of reacting with the gums to one of solid material to form a colloidal mass therefrom, agitating the mass to increase the plasticity, and convert the same into a flowable plastic, removing entrapped gases therefrom, heating the so-treated plastic, casting the plastic in film form upon a casting surface, removing the excess water, and thereafter removing the self-sustaining film from the casting surface.

HAROLD A. LEVEY.